Figure 1:
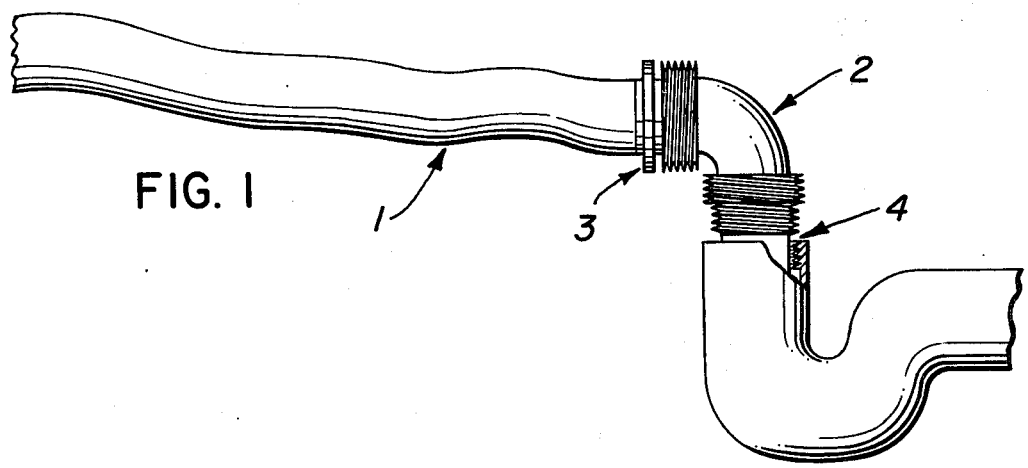

United States Patent [19]

Prest

[11] 4,173,989
[45] Nov. 13, 1979

[54] PREST-O-FIT UNIVERSAL ADAPTER FITTING

[76] Inventor: J. David Prest, 1313 6th Ave., Yuma, Ariz. 85364

[21] Appl. No.: 914,967

[22] Filed: Jun. 12, 1978

[51] Int. Cl.² ............................................. F16L 13/00
[52] U.S. Cl. .................... 138/109; 138/177; 285/177; 285/179; 285/390
[58] Field of Search ............... 138/103, 177, 178, 109; 4/DIG. 7; 285/12, 177, 390, 42, 176, 178, 179

[56] References Cited

U.S. PATENT DOCUMENTS

| | | | |
|---|---|---|---|
| 179,698 | 7/1876 | Hagar | 285/12 X |
| 703,657 | 7/1902 | Horn | 285/12 |
| 1,540,906 | 6/1925 | Schweinart | 285/12 |
| 1,941,467 | 1/1934 | Fausek et al. | 285/179 X |
| 2,523,585 | 9/1950 | Mueller et al. | 285/177 X |
| 2,546,348 | 3/1951 | Schuman | 285/177 X |
| 2,579,863 | 12/1951 | Robinson | 285/177 X |
| 3,052,257 | 9/1962 | Bartlett | 285/177 X |
| 3,413,878 | 1/1968 | Maky | 285/179 X |
| 3,520,561 | 7/1970 | Rininger | 285/390 X |
| 3,768,476 | 10/1973 | Raitto | 285/12 |
| 4,026,583 | 5/1977 | Gottlieb | 285/382.4 X |
| 4,067,072 | 1/1978 | Izzi | 285/12 X |
| 4,073,512 | 2/1978 | Jian et al. | 285/12 |
| 4,133,312 | 1/1979 | Burd | 285/12 |

FOREIGN PATENT DOCUMENTS 2761 of 1889 United Kingdom ..................... 285/177
1180 of 1901 United Kingdom ..................... 285/177

OTHER PUBLICATIONS

MPEP 706.03(c), 608.01(m), 608.04 and 714.02.

*Primary Examiner*—Richard E. Aegerter
*Assistant Examiner*—James E. Bryant, III
*Attorney, Agent, or Firm*—Cahill, Sutton & Thomas

[57] ABSTRACT

A conventional, flexible sewer drain hose from recreational vehicles, is normally connected to the most common public or private sewer systems, by means of one of many different adaptor fittings, or by means of one fitting utilizing movable or mechanical parts. This device is designed primarily for the purpose of making any of these adaptations with one simple fitting, which does not depend on moving or mechanical parts for its seal, and is described in detail in the following description.

10 Claims, 2 Drawing Figures

PREST-O-FIT UNIVERSAL ADAPTER FITTING

My invention relates to a new and useful device, to be used for the purpose of adapting a standard three inch inside diameter flexible sewer hose, from a camper, trailer, motor home, or any other recreational vehicle to any one of the various size sewer openings provided at public or private parking sites. It is a well known and established fact, that the vast majority of trailer parks and camp grounds provide one of the following types and/or size openings at each rental space; three inch male pipe thread, three inch female pipe thread, three and one half inch female pipe thread, four inch female pipe thread, three inch smooth inside diameter pipe.

It is obviously desirable to provide a means whereby the greatest variety of connections might be possible utilizing one fitting, and if possible with few or no movable or mechanical parts.

Another object of the invention is to provide a device of the character herewithin described which is simple in construction, economical in manufacture, and easily attached to flexible sewer hoses and sewage disposal openings without modification to said hoses or sewage disposal openings.

Figure 2:
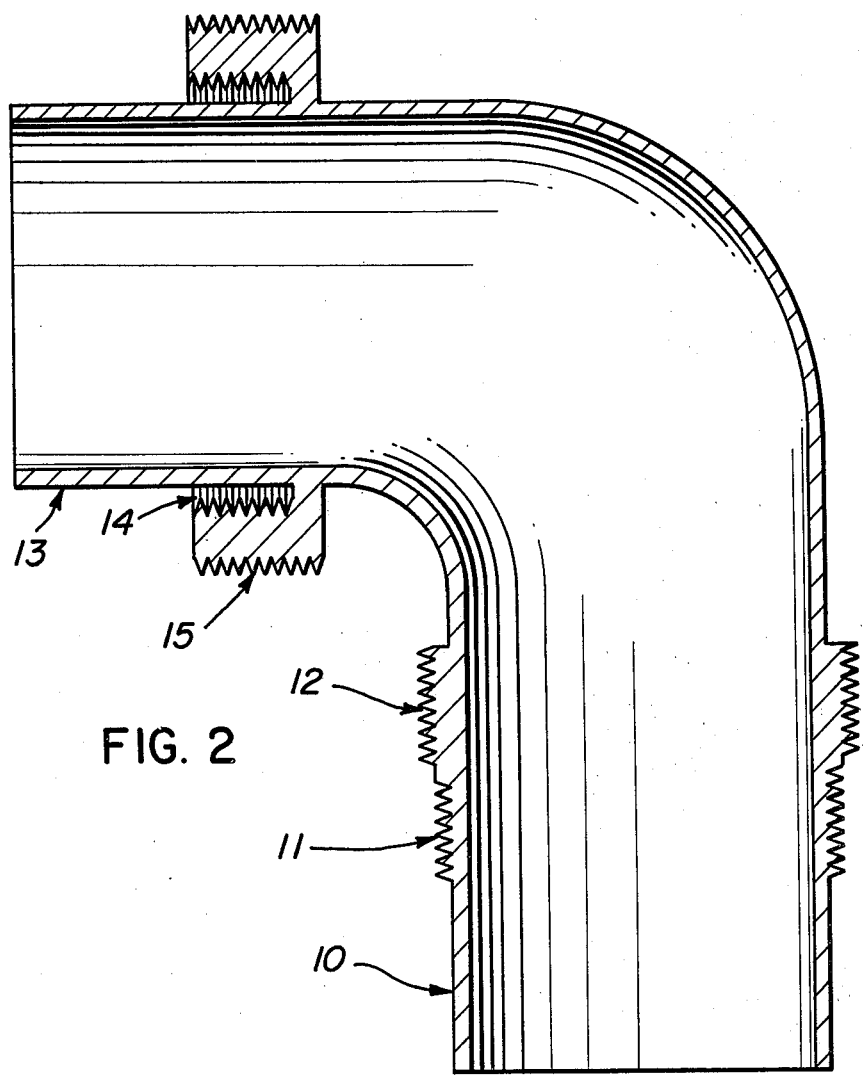

With the foregoing in view, and all those objects, purposes or advantages which may become apparent from the consideration of this disclosure and specification, the present invention consists of the concept embodied in the method, process, construction, arrangement of parts, or new use of same, as herein particularly exemplified in one or more specific embodiments of such concept, reference being had to the accompanying figure in which:

FIG. 1 is a schematic diagram illustrating a typical sewage hose to sewer line connection with my device being utilized as the adapter; and FIG. 2 is a cross-sectional view of my adapter.

Proceding therefore to describe my invention in detail, reference to the drawing will show that I have illustrated the essential parts necessary to dispose of sewage from a recreational vehicle with toilet facilities to a public or private sewer system, in a sanitary fashion. These parts consist of the flexible sewer hose 1, connected to adapter fitting 2 by means of a stainless steel clamp 3 and adapter fitting 2 attached to sewer opening 4 by means of a threaded connection, or by inserting the spigot end of the adapter fitting 2 into the pipe opening 4.

Again referring to the figure of the drawing and more specifically to that portion of the figure within the dotted outline, my invention is described in detail as follows: the sewer adapter fitting comprising the three inch outside diameter by one and three eighth inch long spigot end 10, and three inch male pipe thread 11, and three and one half inch male pipe thread 12, at one end, with the three inch outside diameter by one and three eighth inch long spigot end 13, and three inch female pipe thread 14, and four inch male pipe thread 15, at the opposite end. The unique arrangement of the sizes and shapes of this fitting enables the user to connect either end to the sewer hose, thereby making any one of the other parts available for connection to the sewer disposal opening.

Since various modifications can be made to the invention herein described within the scope of the invention concept disclosed, it is not intended that protection of the said invention should be interpreted as restricted to the modification or modifications or known parts of such concept as have been particularly described, defined, or exemplified, since this disclosure is intended to explain the construction, and operation of such concept, and not for the purpose of limiting protection to any specific embodiment or detail thereof.

I claim:

1. A universal one piece adapter fitting for connecting the sewage drain hose of a recreational vehicle to the input pipe of a sewage system, said fitting comprising in combination:
   (a) a hollow connector having a first arm and a second arm;
   (b) said first arm including:
      i. a cylindrical end having a smooth external surface;
      ii. a first male threaded section circumscribing said first arm, said first male threaded section being longitudinally displaced from said smooth surfaced cylindrical end; and
      iii. a second male threaded section circumscribing said first arm; said second male threaded section being longitudinally and radially outwardly displaced from said first male threaded section;
   (c) said second arm including:
      i. a further cylindrical end having a smooth external surface;
      ii. a female threaded section circumscribing said second arm, said female section being radially outwardly displaced from said smooth surfaced cylindrical end; and
      iii. a third male threaded section circumscribing said second arm, said third male section being radially displaced from said female threaded section;
   whereby, said connector interconnects the drain hose with any of a smooth surfaced, a male threaded or a female threaded sewage system input pipe.

2. The fitting as set forth in claim 1 wherein said connector is an elbow.

3. The fitting as set forth in claim 2 wherein said elbow is a 90° elbow.

4. The fitting as set forth in claim 1 wherein said female threaded section and said third male section are radially superimposed upon one another.

5. The fitting as set forth in claim 4 wherein aid third male threaded section circumscribes said female threaded section.

6. The fitting as set forth in claim 5 wherein:
   (a) said cylindrical end and said further cylindrical end are three inches in outside diameter;
   (b) said first male threaded section is a three inch male pipe thread;
   (c) said second male threaded section is a three and one half inch male pipe thread;
   (d) said third male threaded section is a four inch male pipe thread; and
   (e) said female threaded section is a three inch female pipe thread.

7. The fitting as set forth in claim 6 wherein said connector is an elbow.

8. The fitting as set forth in claim 7 wherein said elbow is a 90° elbow.

9. The fitting as set forth in claim 8 wherein said cylindrical end is at least one and one eighth inch long.

10. The fitting as set forth in claim 9 wherein said further cylindrical end is at least one and one eighth inch long.

* * * * *